(12) United States Patent
Gillaspy et al.

(10) Patent No.: US 6,959,328 B1
(45) Date of Patent: Oct. 25, 2005

(54) METHOD AND SYSTEM FOR IMPROVING EMAIL TRAFFIC USING A DIGITAL IMAGING DEVICE

(75) Inventors: Richard Adams Gillaspy, Raleigh, NC (US); Lynn Erich Petersen, Raleigh, NC (US)

(73) Assignee: IPAC Acquisition Subsidiary I, LLC, Portsmouth, NH (US)

( * ) Notice: Subject to any disclaimer, the term of this patent is extended or adjusted under 35 U.S.C. 154(b) by 0 days.

(21) Appl. No.: 09/527,077

(22) Filed: Mar. 16, 2000

(51) Int. Cl.$^7$ ............................................. G06F 15/16
(52) U.S. Cl. ..................................................... 709/220
(58) Field of Search .............................. 709/223, 227, 709/230, 220

(56) References Cited

U.S. PATENT DOCUMENTS

| | | | |
|---|---|---|---|
| 5,838,685 A * | 11/1998 | Hochman | 370/428 |
| 5,937,160 A * | 8/1999 | Davis et al. | 395/200.33 |
| 6,275,882 B1 * | 8/2001 | Cheever et al. | 710/103 |
| 6,345,288 B1 * | 2/2002 | Reed et al. | 709/201 |
| 6,463,464 B1 * | 10/2002 | Lazaridis et al. | 709/207 |
| 6,687,741 B1 * | 2/2004 | Ramaley et al. | 709/206 |

* cited by examiner

Primary Examiner—David Y. Eng
(74) Attorney, Agent, or Firm—Sawyer Law Group LLP (57) ABSTRACT

A method and system for improving email traffic which can involve portable digital imaging devices is disclosed. In first and second aspects, the method and system allow a portable digital imaging device to receive an attachment associated with an email message. A first type of attachment is allowed by the portable digital imaging device. The attachment is described a second type. In the first aspect, the method and system include determining whether the first type is the same as the second type prior to sending the attachment to the portable digital imaging device and providing the attachment to the portable digital imaging device only if the first type is the same as the second type. In the second aspect, the method and system include utilizing the portable digital imaging device to determine whether the first type is the same as the second type while receiving the email message, accepting the attachment if the first type is the same as the second type and terminating receipt of the attachment if the first type does not is the same as the second type. In a third aspect, the method allows an image that can be from a portable digital imaging device to be viewed by a recipient. In this aspect, the method and system include receiving the image and an identity of the recipient, storing the image in a location having an address and sending a message to the recipient using the identity of the recipient. The message includes the address and excludes the image.

14 Claims, 10 Drawing Sheets

100

- 102 Determine Whether Each Attachment Type is Included In the Types Allowed on the Portable Digital Imaging Device

- 104 Send Attachments to Portable Digital Imaging Device If Attachments'. Types Are Allowed on the Portable Digital Imaging Device

- 106 Do Not Send Attachments to Portable Digital Imaging Device If Attachments' Types Are Not Allowed on the Portable Digital Imaging Device

Prior Art

Figure 1

Prior Art

METHOD AND SYSTEM FOR IMPROVING EMAIL TRAFFIC USING A DIGITAL IMAGING DEVICE

FIELD OF THE INVENTION

The present invention relates to digital imaging devices, and more particularly to a method and system for more efficiently sending or receiving email via a digital imaging device.

BACKGROUND OF THE INVENTION

Currently, many portable devices are available for a variety of applications. Digital imaging devices, such as digital cameras, are used for capturing images. Once the image is captured, the user may wish to download the image to a desktop computer. The user may also wish to provide the image to friends or other individuals.

Some conventional portable devices, such as personal digital assistants ("PDAs") are capable of performing functions such as email. Such portable devices can send and receive email messages remotely, for example via a modem coupled to a cellular telephone. Often, attachments are associated with email messages. For example, a sender utilizing a PDA or a desktop computer may wish to send a file associated with a particular application to a recipient. Such files can include EXCEL or other spreadsheet files, documents formed using a word processing program and images.

Figure 1:
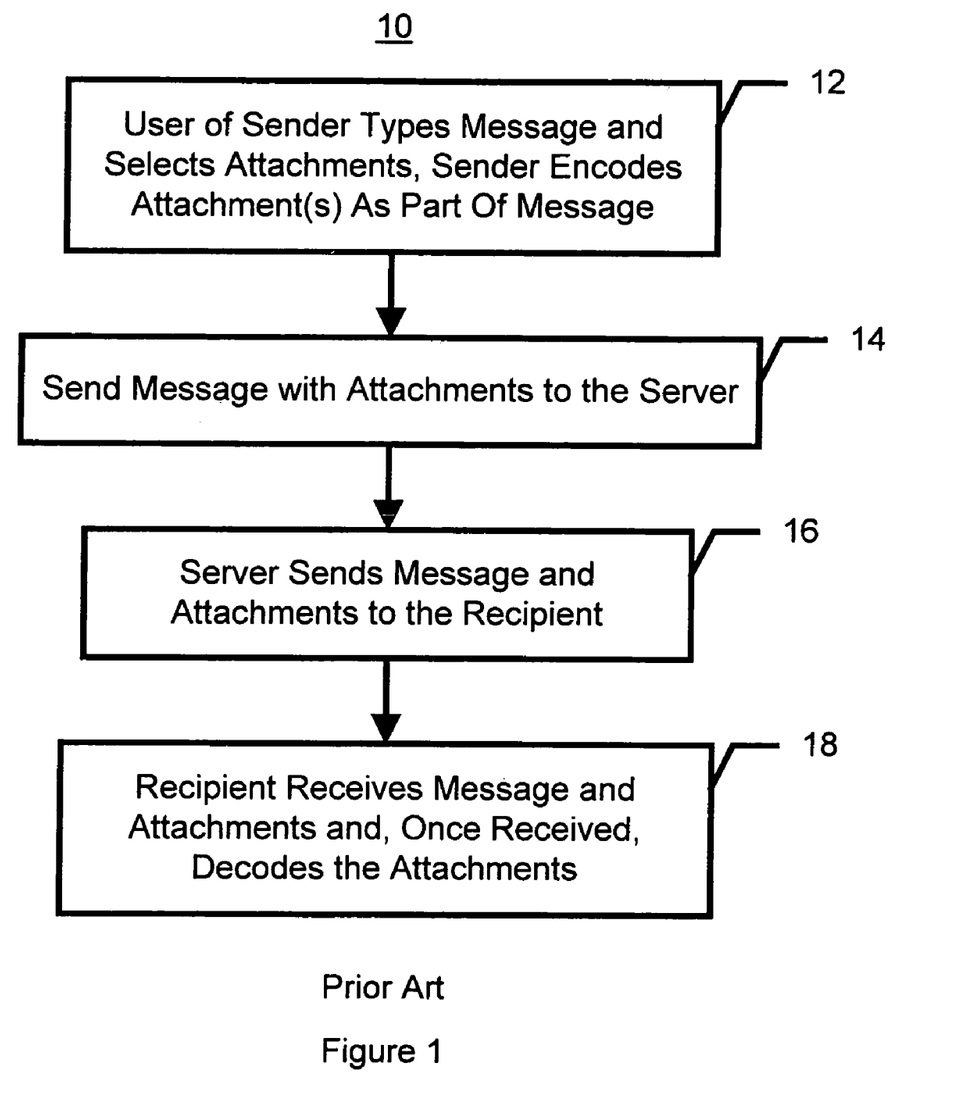
FIG. 1 is a flow-chart of a conventional method for sending and receiving email

For example, FIG. 1 depicts a high-level flow chart of a conventional method 10 for providing sending and receiving messages having attachments via email. A user of the sender (e.g. a PDA or other computing device) types in a message and adds one or more attachments to the message, via step 12. Step 12 also typically includes the sender (the PDA or other computing device) encoding the attachments and adding the encoded attachments to the end of the message. For example, one encoding scheme that is currently used is MIME (Multipurpose Internet Mail Extensions). MIME encodes the attachment as text. Typically, a message using MIME encoding includes the text of the message itself, a MIME header for each attachment, and the text encoding for each attachment. The MIME header for a particular attachment is typically followed immediately by the text encoding for a particular attachment. Thus, a typical email message with attachments includes the text of the message followed by a header and encoded text for a first attachment, a header and encoded text for the second attachment and subsequent headers and encoded text for each subsequent attachment.

Once the message is completed, the sender sends the message including the encoded attachments to a server, which is typically an SMTP email server, via step 14. After receiving the message, the server sends the message to the recipient, via step 16. The recipient can be a PDA, a desktop computer or another computing device. If the user of the sender requested multiple recipients, then the server will send the message to each of the recipients in step 16. The recipient receives the message and, once received, decodes the message, via step 18. Thus, the message is received before the recipient decodes each of the attachments. In order to decode the attachment, the recipient reads the message. As the recipient reads the message, attachments are detected by detecting the presence of MIME headers. MIME headers typically include the name and a type designation of the attachment. Based on the name, the type designation, or both, the recipient determines the type of the attachment. The recipient also decodes the attachment from text into another form. The recipient can then accurately display the attachments to a user of the recipient and allow the appropriate applications running on the recipient to utilize the attachments.

Figure 2A:
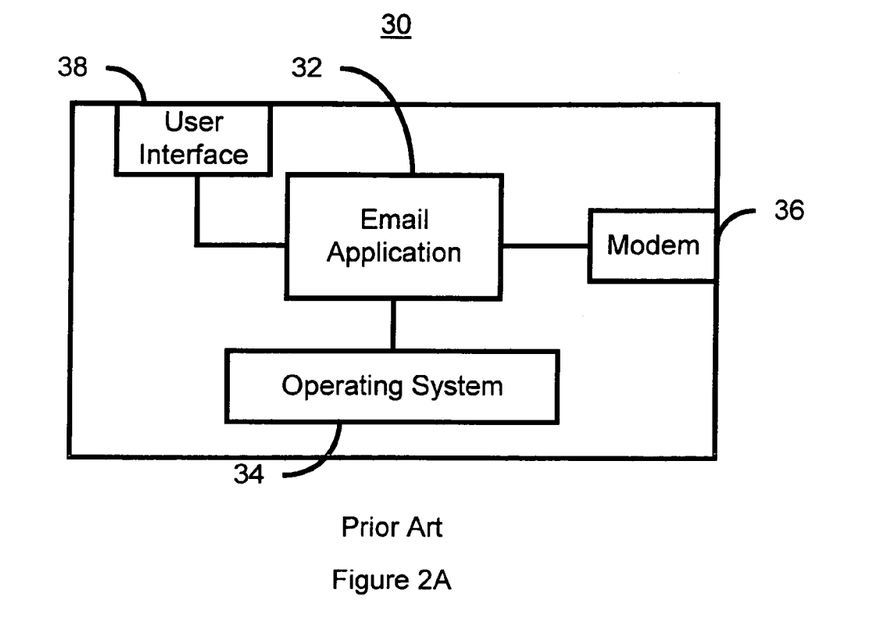
FIG. 2A is a block diagram of a digital camera developed by the assignee of the present invention that can send email messages.

In addition to the above-mentioned conventional devices which can send and receive email, the assignee of the present application has constructed a portable digital imaging device which is capable of sending email. FIG. 2A depicts a high-level diagram of a digital camera 30 in accordance with the teachings of the assignee. The digital camera 30 includes a control application which, for the purposes of sending email, is an email application 32. The email application 32 interfaces with an operating system 34 that controls lower level functions of the digital camera 30. The email application 32 also interfaces with the user interface ("UI") 38 which may be some combination of an LCD, soft keys, and a directional button. Also depicted as part of the digital camera 30 is a modem 36. However, the modem currently used is preferably not integrated within the digital camera 30.

Only the email application 32 is depicted in FIG. 2A. However, the digital camera 30 could be capable of operating using other control applications (not shown) in lieu of the email application 32. In such a case, the control application used may be selected upon booting up of the digital camera 30. In order to select other control applications, including the control application which allows the digital camera 30 to capture images, the digital camera 30 is rebooted with another control application. In another case, multiple control applications may be run without rebooting the digital camera 30. The email application 32 is preferably provided with sufficient code to perform networking functions, controlling of ports or the modem 36 and interfacing with a server which is used for email traffic.

Figure 2B:
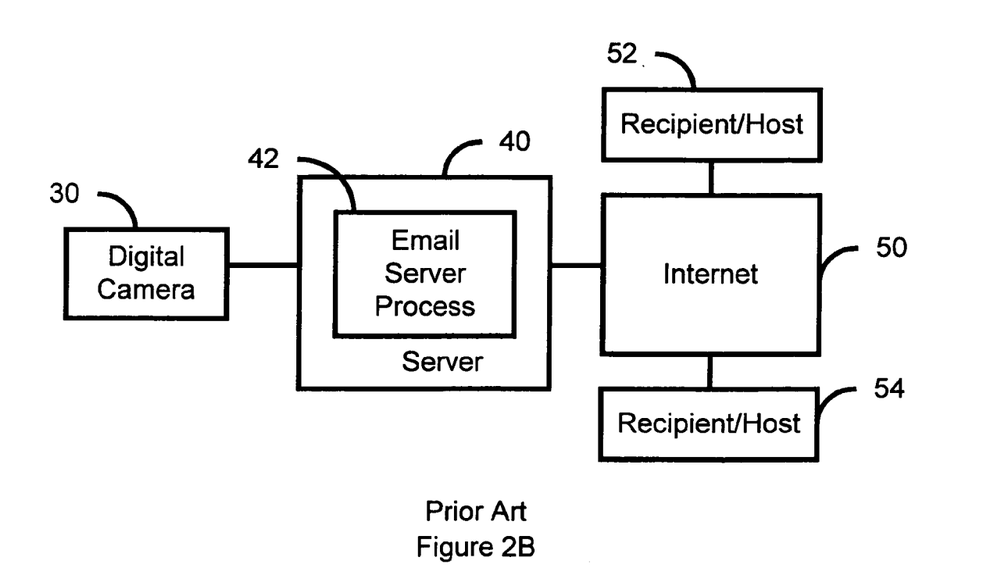
FIG. 2B is a block diagram of the digital camera developed by the assignee of the present invention as used to send email messages.

FIG. 2B depicts the digital camera 30 as coupled to a server 40 which may be used for sending email. The server 40 includes an email server process 42. The email server process 42 may include multiple server process. The email server process 42 controls the server's 40 reception of email, connection to the internet 50 and sending of email to the appropriate recipients. The server 40 connects to the internet 50 and can send messages to the recipients 52 and 54. The recipients 52 and 54 may include PDAs, desktop computers, laptops, or other computing devices.

Referring to FIGS. 2A and 2B, a user of the digital camera 30 might provide a message and/or select images for emailing. When the user selects an image to send with the message, the image is typically an attachment to the message. The user of the digital camera 30 also indicates the addresses for one or more recipients of the email message. Typically, these functions are performed using some combination of the LCD screen, soft keys and directional buttons of the UI 38. The email application 32 then controls linking with the internet 50 via the server 40. The email application 32 also includes code which allows the digital camera 30 to interface with the email server process 42. The email application 32 thus sends the message and attachments, which may be encoded as discussed above, to the server 40. The email server process 42 can then control sending of the email messages to the appropriate recipients, such as the recipients 52 and 54. Thus, the email application 32 for the digital camera 30 interfaces other software and hardware within the digital camera in order to allow a user to send email. Thus, using a portable digital imaging device such as the digital camera 30, a user can send email, including images.

Although the method 10 and portable digital imaging devices, such as the digital camera 30, can allow email traffic including attachments to flow between senders and recipients, one of ordinary skill in the art will readily realize that there are drawbacks. In particular, attachments are often expensive to send and receive and can unnecessarily consume power. It is currently possible to send and receive email via PDAs. It would be desirable to receive email messages, including email message having attachments, on a portable digital imaging device such as the digital camera 30. However, attachments are typically significantly larger than the messages to which they correspond. Consequently, messages having attachments take significantly longer to send and receive. For portable devices, including portable digital imaging devices such as the digital camera 30, long send and receive times are undesirable for many reasons. A user of the digital camera 30 may be using a cellular telephone in order to connect to the server 40. Use of a cellular telephone is very expensive and typically increases as the telephone is used longer. Thus, performing email functions using the digital camera 30 may be quite expensive. Furthermore, the digital camera 30 has a power supply which is limited by the charge of the battery used in the digital camera 30. It is, therefore, desirable to extend the life of the battery. Because sending and receiving attachments requires a large amount of time, battery power is consumed by performing email functions. In addition, the digital camera 30 may recognize only a small portion of the types of attachments that are possible. For example, the digital camera 30 may recognize and be capable of displaying and using a variety of image attachments, but may not be capable of recognizing, displaying and using other types of attachments such as word processing files. Thus, attachments which may be unusable, which require a large amount of time to download and which consume battery power during downloading may be provided to the digital camera 30 via email. In addition, attachments also increase the traffic over the already busy internet 50.

Accordingly, what is needed is a system and method for improving the efficiency of email exchanges via a digital imaging devices. The present invention addresses such a need.

SUMMARY OF THE INVENTION

The present invention provides a method and system for improving email traffic which can involve a portable digital imaging devices. In a first aspect, the method and system allow a portable digital imaging device to receive an attachment associated with an email message. A first type of attachment is allowed by the portable digital imaging device. The attachment is described a second type. In the first aspect, the method and system comprise determining whether the first type is the same as the second type prior to sending the attachment to the portable digital imaging device, providing the attachment to the portable digital imaging device if the first type is the same as the second type; and refusing to provide the attachment to the portable digital imaging device if the first type is not the same as the second type. In a second aspect, the method and system also allow a portable digital imaging to receive an attachment associated with an email message. The portable digital imaging device can use a first type of attachment, while the attachment has a second type. In the second aspect, the method and system comprise utilizing the portable digital imaging device to determine whether the first type is the same as the second type while receiving the email message, accepting the attachment if the first type is the same as the second type, and terminating receipt of the attachment if the first type is not the same as the second type. In a third aspect, the method allows an image that can be from a portable digital imaging device to be viewed by a recipient. In the third aspect, the method and system comprise receiving the image and an identity of the recipient, storing the image in a location having an address and sending a message to the recipient using the identity of the recipient, the message including the address and excluding the image.

According to the system and method disclosed herein, the present invention allows the reception of attachments by a portable digital imaging device to be more selective and less time consuming and allows for the reduction of traffic to recipients. As a result, communication is made more efficient.

DETAILED DESCRIPTION OF THE INVENTION

The present invention relates to an improvement in digital imaging devices and email. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention will be described in terms of a digital camera and a server. However, one of ordinary skill in the art will readily recognize that this method and system will operate effectively for other portable digital imaging devices and other systems which can be used in sending and receiving email. Furthermore, the present invention will be described in the context of particular methods having particular steps in a certain order. However, one of ordinary skill in the art will readily recognize that the present invention is consistent with other methods having other steps and steps occurring in a different order.

Figure 3:
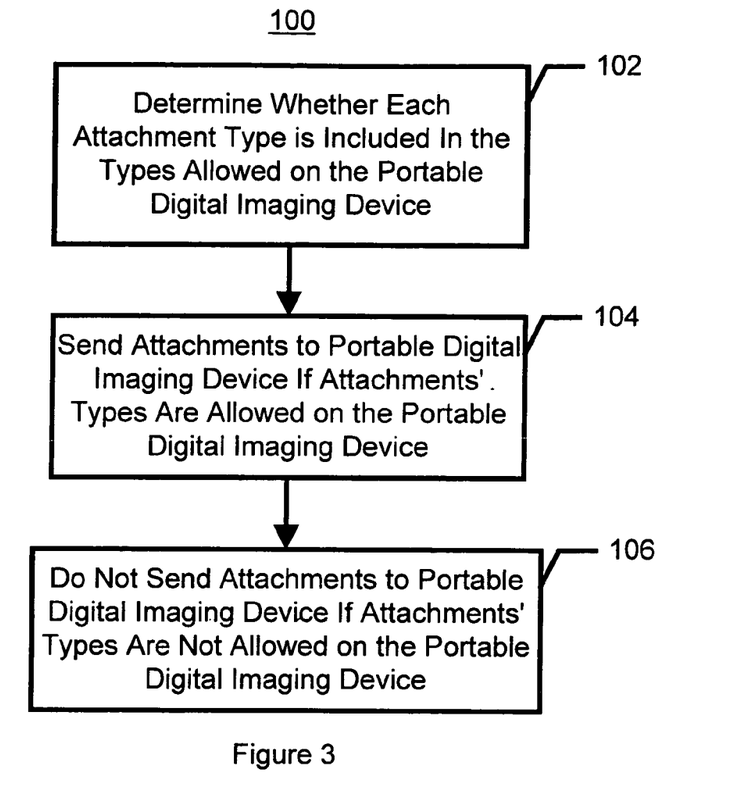
FIG. 3 is a high-level flow chart of a method for improving the efficiency of email traffic in accordance with a first aspect of the present invention.

To more particularly illustrate the method and system in accordance with the present invention, refer now to FIG. 3, depicting one embodiment of a method 100 for improving efficiency of reception of email in accordance with a first aspect of the present invention. The method 100 is preferably implemented by an email server, as discussed below. The method 100 improves the efficiency of email traffic by reducing the amount of unusable attachments sent to a portable digital imaging device. The method 100 preferably functions on one or more email messages which may have attachments. The attachments to a message are typically a header followed by encoded text appended to the end of the message. The header generally includes information relating to the type of the attachment. The message(s) are to be received by a portable digital imaging device which is capable of receiving email. In a preferred embodiment, the portable digital imaging device functions as a conventional email recipient when receiving email. For example, the portable digital imaging device might use POP3, IMAP or SMTP protocols to receive the message. For example, if SMTP protocol is used once the message is received, the portable digital imaging device would read the message. If any attachments are detected, for example if MIME headers are detected, then the attachments would be decoded. The portable digital imaging device would also determine the type of attachment, generally based on the information in the MIME header for the attachment. The portable digital imaging device is capable of recognizing and using attachments of particular types. For example, the portable digital imaging device may be capable of recognizing and using attachments which are different types of images.

It is determined whether each attachment for each message is of a type that the portable digital imaging device can recognize and use, via step 102. Thus, step 102 determines whether the type for each attachment of each message is included in, or the same as, the types of attachments which are allowed on the portable digital imaging device. Step 102 is preferably performed by reading the message, determining whether headers for attachments are present, determining the type of each attachment based on information in the header and comparing the type of each attachment to the types allowed by the portable digital imaging device.

If the type of attachment is one that can be used by the portable digital imaging device, then the attachment is sent to the portable digital imaging device, preferably when the message is sent, via step 104. Step 104 could simply include sending the encoded attachment as encountered in the message. Step 104 could also include reencoding the attachment. If the type of attachment is not one that can be used by the portable digital imaging device, then the attachment is prevented from being sent to the portable digital imaging device, via step 106. Once the portable digital imaging device receives messages and the attachments allowed on the portable digital imaging device, the attachments can be decoded, displayed to a user and used on the portable digital imaging device.

Thus, only those attachments that can be recognized or used by the portable digital imaging device are sent to the portable digital imaging device by the server. As a result, the portable digital imaging device will not consume power and time by downloading a possibly large attachment that the portable digital imaging device cannot use. The consumption of the user's time in downloading an unusable attachment, the expense of connecting to the server to receive an unusable attachment and the consumption of battery power in receiving the unusable attachment are thereby avoided.

Figure 4A:
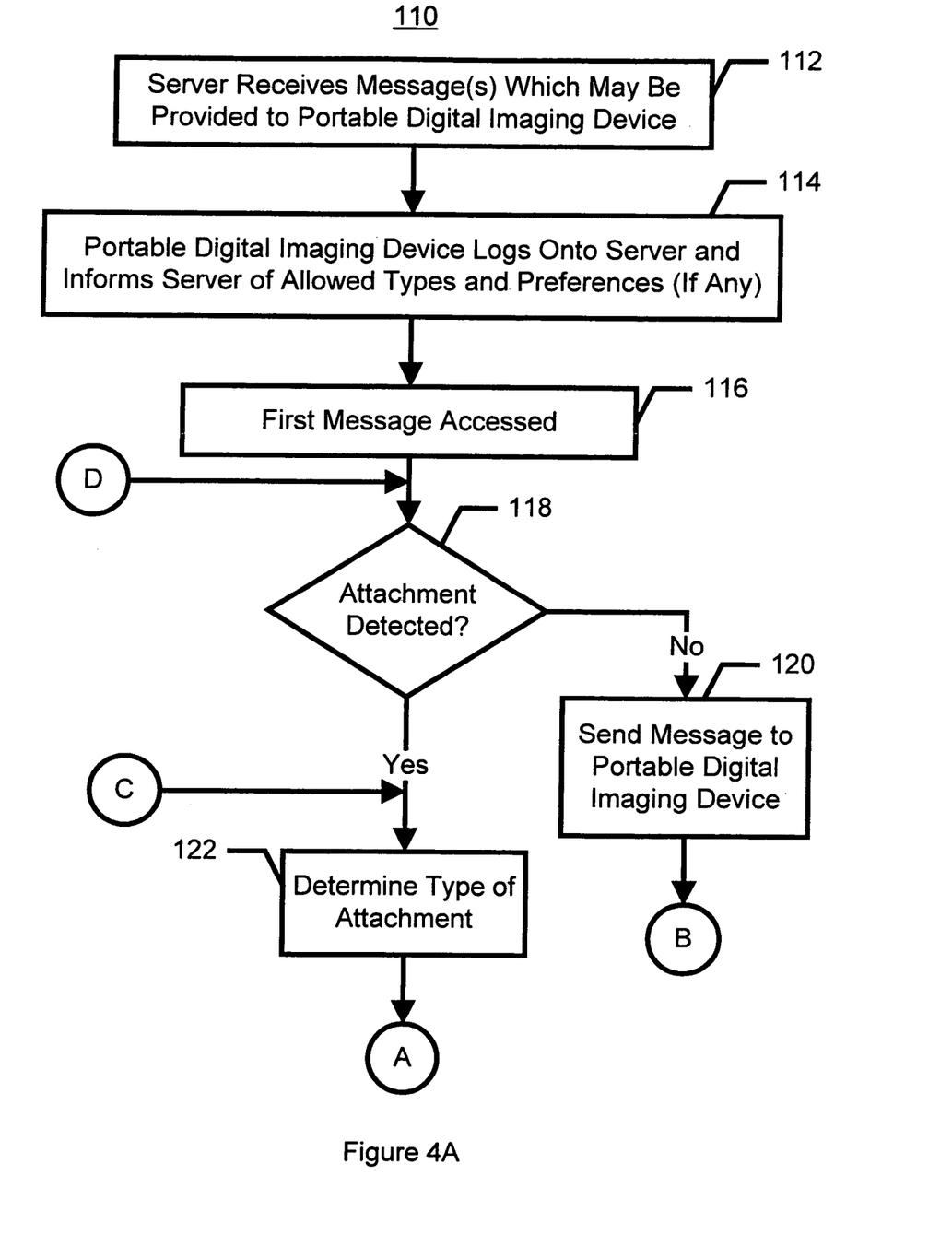
FIGS. 4A and 4B depict a more detailed flow chart of one embodiment of a method for improving the efficiency of email traffic in accordance with the first aspect of the present invention.
Figure 4B:
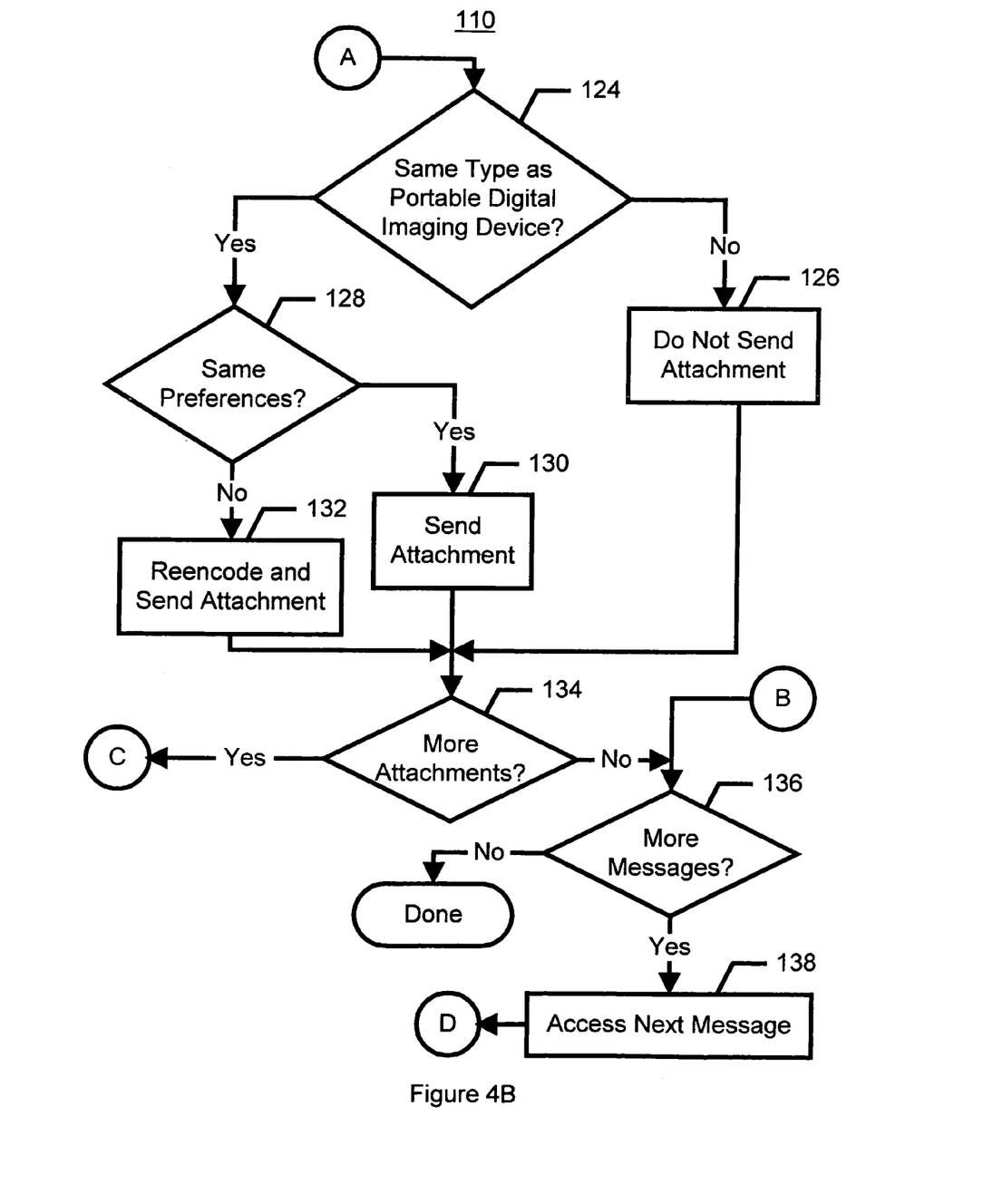

FIGS. 4A and 4B depicts a more detailed flow chart of a method 110 of a preferred embodiment of a method for improving the efficiency of the reception of email in accordance with the first aspect of the present invention. The method 110 improves the efficiency of email traffic by reducing the amount of attachments sent to a portable digital imaging device. The method 110 is preferably implemented by a mail server or other apparatus which is used to send email to a portable digital imaging device capable of receiving email. The method 110 is also preferably used for email traffic in which the attachments for a particular message are encoded, generally in text, and appended to the particular message.

The server receives one or more email messages having attachments which are addressed to a recipient, via step 112. The recipient can be a portable digital imaging device. The server receives the types of attachments allowed by the portable digital imaging device and the preferences, if any, for the types of attachments, via step 114. Step 114 is preferably performed when the portable digital imaging device connects with the server to receive email messages. The portable digital imaging device preferably informs the server of the types of attachments which are allowed for the portable digital imaging device and the preferences of the portable digital imaging device for certain types of attachments allowed by the portable digital imaging device. The preferences of the portable digital imaging device relate to the preferred properties for the attachment types allowed by the portable digital imaging device. For example, in step 114, the portable digital imaging device may inform the server that the portable digital imaging device is capable of accepting a particular type of image. The portable digital imaging device may also inform the server that the preferences for that type of image include a particular resolution of the image.

The first message to be sent to the portable digital imaging device is accessed, via step 116. Step 116 could be performed in response to a user of the portable digital imaging device selecting a particular message for downloading. It is determined whether there is an attachment to the first message, via step 118. Step 118 is preferably performed by reading the message and determining whether a header for an attachment is encountered as the message is read. If there is no attachment, then the message is simply sent to the portable digital imaging device, via step 120.

If there is an attachment, then the type of the attachment is determined, via step 122. Preferably, step 122 includes reading the header for the attachment and determining the type of the attachment based on the name, the type designation, or both that are read from the header. Step 122 could include accessing another portion of the message to obtain information relating to the type of the attachment detected and determining the type of the attachment based on this information. It is then determined whether the attachment type is one of the types allowed by the portable digital imaging device, via step 124. Preferably, step 124 is performed by comparing the attachment type to the types allowed by the portable digital imaging device. If it is determined that the attachment type is not allowed by the portable digital imaging device, then it is ensured that the attachment is not sent, via step 126. Step 126 could include sending the message without sending the attachment. Step 126 also preferably includes ensuring that the attachment and the corresponding email message remain on the server so that the user can retrieve the attachment at another time.

If the attachment is of a type allowed by the portable digital imaging device, then it is determined whether the preferences for the attachment are the same as any preferences specified by the portable digital imaging device, via step 128. If the preferences match, then the attachment is merely sent to the portable digital imaging device without modification, via step 130. However, if the preferences for the attachment are different, then the attachment is reencoded with the desired preferences and sent to the portable digital imaging device, via step 132. Step 132 may be performed because attachments are typically encoded in text at the end of the corresponding message. If the preferences of the attachment are not the same as for the portable digital imaging device, then the attachment is read, decoded and reencoded in order to change the preferences and deliver the message to the portable digital imaging device. The reencoded attachment is preferably appended to the message in place of the original attachment.

Whether or not the attachment has been sent, it is determined whether there is an additional attachment for the message, via step 134. Preferably, step 134 is performed by continuing to read the message to be sent to the portable digital imaging device and determining whether another header for another attachment is encountered. If there is an additional attachment, then step 122 is returned to. Thus, step 134 ensures that all attachments for a message to be received by a portable digital imaging device are accounted for. If it is determined there are no more attachments in step 134 or the message having no attachments was sent in step 120, then it is determined if there is another message to be sent to the portable digital imaging device, via step 136. Step 136 may include determining whether a user of the portable digital imaging device selects another message for downloading. If there is another message to be downloaded, then the next message is accessed, via step 138. Step 118 and subsequent steps are then repeated for the next message. Thus, multiple messages can be provided to the portable digital imaging device in a single session. If there are no more messages to be delivered to the portable digital imaging device, then the method 110 terminates.

Thus, the method 110 allows only attachments which the portable digital imaging device can recognize and/or use to be received by the portable digital imaging device. As a result, time and resources are not unnecessarily consumed. Furthermore, although attachment may not be sent using the methods 100 and 110, the text of the messages can be sent without sending the attachments. Thus, the user of the portable digital imaging device can be made aware of the existence of email messages having attachments that cannot be received by the portable digital imaging device. In addition, the attachments which are not sent to the portable digital imaging device can be retrieved at a later time.

Figure 5:
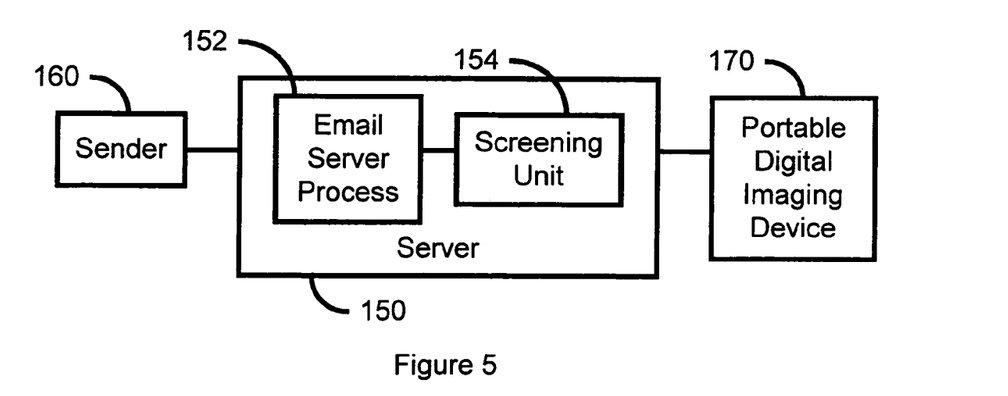
FIG. 5 is a block diagram of one embodiment of a server using in improving the efficiency of email traffic in accordance with the first aspect of the present invention.

FIG. 5 is a block diagram of one embodiment of a server 150 used for improving the efficiency of email traffic in accordance with the first aspect of the present invention. The server 150 includes an email process 152 and a screening unit 154. The server 150 is also depicted as being coupled with a sender 160 and a portable digital imaging device 170. The server 150 is typically coupled to the sender 160 via the internet (not shown). The screening unit 154 is preferably one or more server processes which implement the method 100 or 110. The email process 152 preferably is a conventional email process, except for the ability to interface with the screening unit 154. Thus, the email process 152 controls the reception of email messages from the sender 160. The screening unit 154 implements the methods 100 or 110 and is used for sending email messages to devices such as the portable digital imaging device 170. The sender 160 may be a conventional computing device, such as a personal digital assistant ("PDA"), a desktop computer, another portable digital imaging device or other computing device capable of sending email messages. The portable digital imaging device 170 is capable of receiving email messages. Because the server 150 utilizes the screening unit 154, the portable digital imaging device 170 need not have any capability of screening unusable attachments from being received. However, as discussed below, the portable digital imaging device could have such a capability and still be used in conjunction with the server 150 and the methods 100 and 110. Thus, using the server 150 containing the screening unit 150 and the methods 100 and 110, attachments which cannot be used or recognized by the portable digital imaging device 170 can be prevented from being received by the portable digital imaging device 170. Consequently, the cost of, time wasted, and power consumed by downloading attachments that are not allowed by the portable digital imaging device 170 can be avoided.

Figure 6:
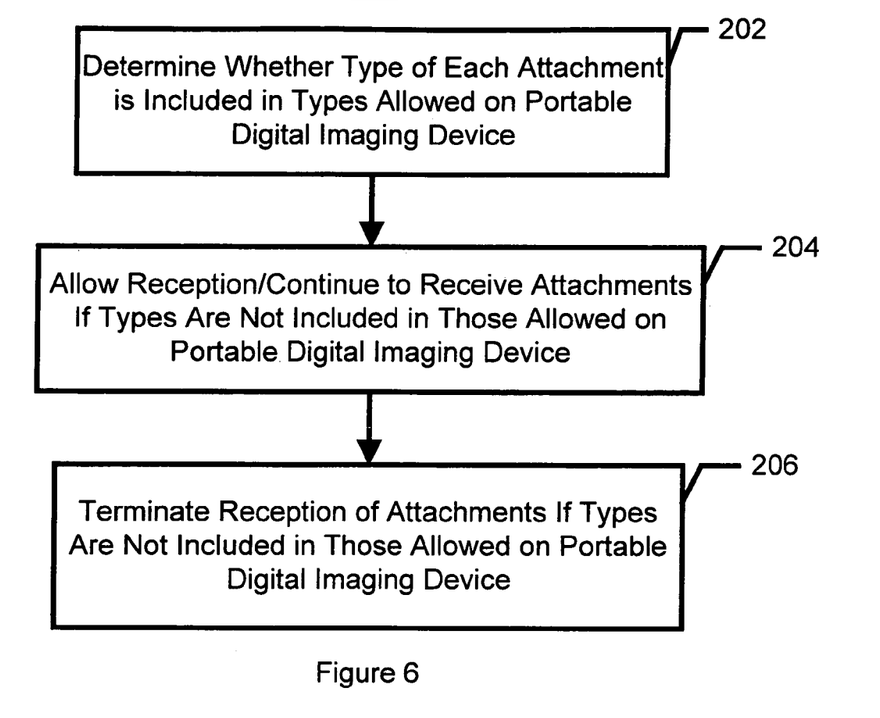
FIG. 6 is a high-level flow chart of a method for improving the efficiency of email traffic in accordance with a second aspect of the present invention.

To more particularly illustrate the method and system in accordance with a second aspect of the present invention, refer now to FIG. 6, depicting a high-level flow chart of a method 200 for improving the efficiency of email traffic in accordance with a second aspect of the present invention. The method 200 improves the efficiency of email traffic by reducing the amount of attachments received by a portable digital imaging device. The method 200 is preferably used by a portable digital imaging device. The method 200 is also preferably used when the methods 100 or 110, depicted in FIGS. 3 and 4, respectively, are not used. Referring back to FIG. 6, the method 200 is thus preferably used when the mail server or other mechanism for delivering email to the portable digital imaging device does not prevent the delivery of attachments that the portable digital imaging device cannot recognize or use. The method 200 preferably functions on one or more email messages which may have attachments. The attachments generally include a header and encoded in text. The attachments are also typically appended to the end of the message. The message(s) and corresponding attachments are to be received by the portable digital imaging device. The portable digital imaging device is capable of recognizing and using attachments of particular types. For example, the portable digital imaging device may be capable of recognizing and using attachments which are different types of images.

It is determined whether the attachments for the message being received are included in the types allowed by the portable digital imaging device, via step 202. A type is allowed by the portable digital imaging device if the portable digital imaging device can recognize and/or use an attachment of that type. Preferably, step 202 is performed by reading at least the header of each attachment, determining the type of each attachment, for example using information in the header, and comparing the type of each attachment to the types allowed by the portable digital imaging device. If the attachment is allowed by the portable digital imaging device, then the attachment is allowed to be received by the portable digital imaging device, via step 204. If, however, the attachment is not allowed by the portable digital imaging device, then reception of the attachment is terminated, via step 206. In a preferred embodiment, step 206 terminates reception of subsequent attachments for the same email message. However, also in a preferred embodiment, subsequent email messages can still be received.

Because only those attachments which can be recognized or used by the portable digital imaging device are allowed to be received, time, power, and the expense of downloading an unusable attachment may be saved. However, in a preferred embodiment, attachments subsequent to an attachment having a type which is not allowed by the portable digital imaging device will not be received. Some of these attachments may have types allowed by the portable digital imaging device, but will not be received. Furthermore, in a preferred embodiment, the preferences of the attachments which are received may not be modified to match preferences of the portable digital imaging device.

Figure 7A:
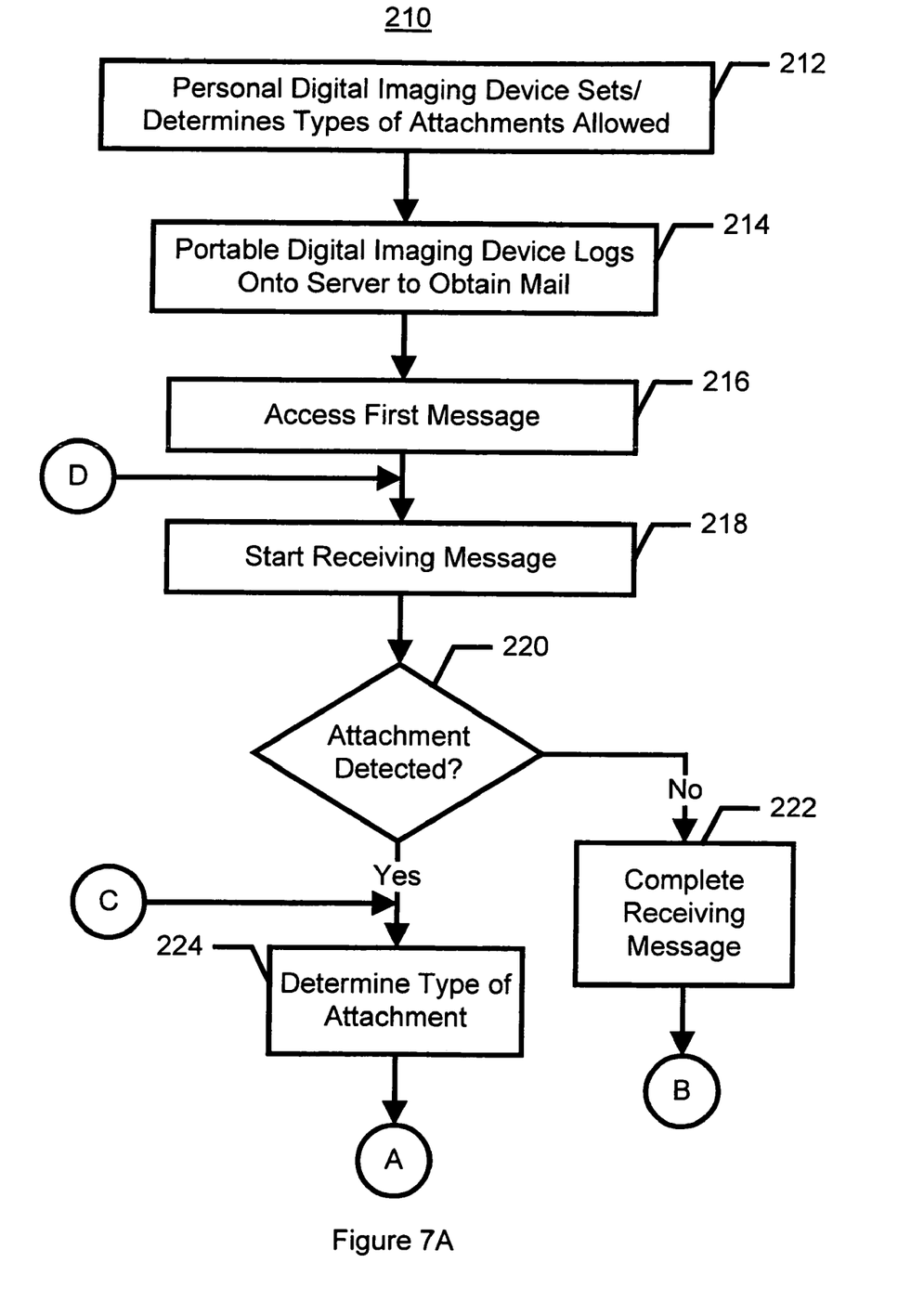
FIGS. 7A–7B depict a more detailed flow chart of one embodiment of a method for improving the efficiency of email traffic in accordance with the second aspect of the present invention.
Figure 7B:
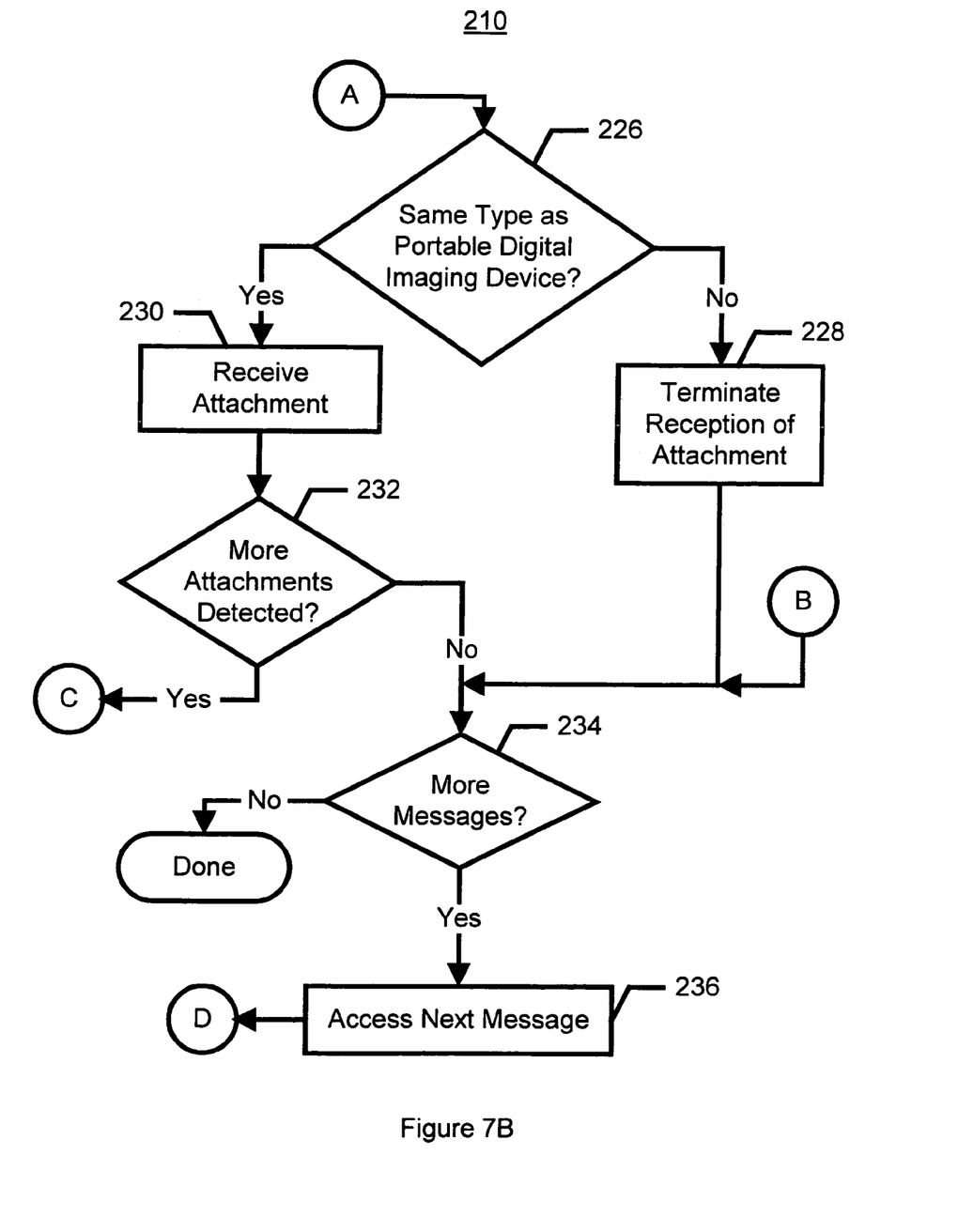

FIGS. 7A–7B depict a more detailed flow chart of a method 210 of a preferred embodiment of a method for improving the efficiency of the reception of email in accordance with the second aspect of the present invention. The method 210 improves the efficiency of email traffic by reducing the amount of attachments received by a portable digital imaging device. The method 210 is preferably used by the portable digital imaging device. The method 210 is also preferably used when the methods 100 or 110, depicted in FIGS. 3 and 4, respectively, are not used. Referring back to FIGS. 7A–7B, the method 210 preferably functions on one or more email messages which may have attachments. The attachments to a message are typically a header followed by encoded text appended to the end of the message. The message(s) are to be received by the portable digital imaging device. The portable digital imaging device is capable of recognizing and using attachments of particular types. For example, the portable digital imaging device may be capable of recognizing and using attachments which are different types of images. In a preferred embodiment, the portable digital imaging device utilizes POP3 protocol.

The types of attachments which are allowed by the portable digital imaging device are determined, via step 212. The type of attachments which are allowed by the portable digital imaging device may be determined at any time prior to reception of the email. The portable digital imaging device then connects to a server or other device in order to receive email, via step 214. The first message to be downloaded is then accessed, via step 216. Step 216 could be performed in response to a user selecting a particular message for delivery to the portable digital imaging device. The portable digital imaging device then commences receiving the message, via step 218. Step 218 preferably includes receiving the message and reading the message as the message is being received. It is then determined whether an attachment to the message being downloaded is detected, via step 220. Step 220 is preferably performed by determining whether a MIME header for an attachment, or other indicia of an attachment, is encountered as the message is being received. Step 220 can be performed during reception of the message because the message is read as the message is being received. If it is determined that there is no attachment to the message, then reception of the message is completed, via step 222.

If an attachment is detected, then the type of the attachment is determined, via step 224. The type of attachment is preferably determined by reading the header and determining the type based on the name, type designation, or both that are contained in the header. However, step 224 could include reading some other portion of the attachment which indicates the type of the attachment and determining the type of the attachment based on this information. It is then determined whether the type of the attachment is included in the types allowed by the portable digital imaging device, via step 226. If the type of the attachment is not one allowed by the portable digital imaging device, then reception of the attachment is terminated, via step 228. Step 228 preferably terminates further reception of the email message. Thus, subsequent attachments will not be received. Step 228 can be accomplished because, as discussed above, the message is read as it is being received. Furthermore, steps 220 through 232 are preferably performed as the message is being received. Thus, the portable digital imaging device does not wait until reception of the message is complete before reading the message, determining whether the message contains attachments that are not allowed on the portable digital imaging device, and taking action based on the attachments type. Note, however that because the message is being read as steps in the method 210 are being performed, some portion of an attachment having a type not allowed on the portable digital imaging device may be received before reception is terminated in step 228.

If, however, it is determined that the attachment is of a type that is allowed by the portable digital imaging device, then the entire attachment is allowed to be received, via step 230. It is then determined whether more attachments are detected, via step 232. Step 232 is similar to step 220. Thus, step 232 preferably includes continuing to read the message and determining whether additional attachments are encountered. If there is an additional attachment, then step 224 is returned to and the type of that attachment is determined. Thus, all attachments for a message up through a first attachment having a type not allowed on the portable digital imaging device are accounted for.

If no more attachments are detected or if reception of the message is terminated in step 228, then it is then determined whether there are additional messages to download, via step 234. If so, then the next message is accessed, via step 236. Step 236 may include the user of the portable digital imaging device selecting the next message to download. Step 218 of receiving the message is then returned to for this new message. If, however, there are no additional messages to download, then the method 210 completes. Once the method 210 is completed, the messages downloaded and the attachments received may be presented to and used by a user of the portable digital imaging device implementing the method 210.

Thus, using the method 210, the portable digital imaging device can terminate reception of attachments having types that are not allowed on the portable digital imaging device. As a result, such attachments are not downloaded to the portable digital imaging device in their entirety. Consequently, the time, expense, and power that would otherwise be incurred by downloading unusable messages are saved.

Figure 8:
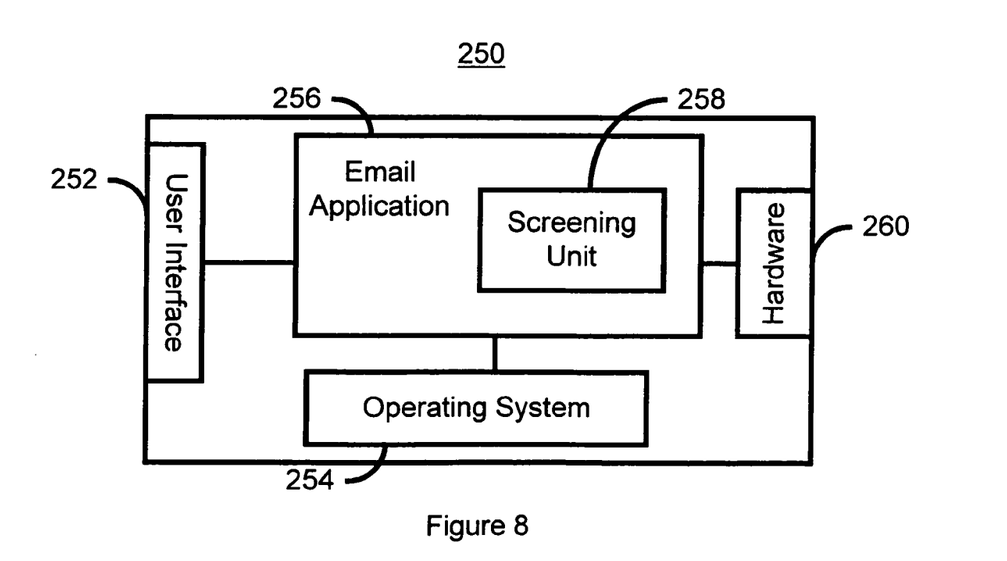
FIG. 8 is a block diagram of one embodiment of a server using in improving the efficiency of email traffic in accordance with the second aspect of the present invention.

FIG. 8 depicts one embodiment of a portable digital imaging device 250 which can implement the method 200 or 210. The portable digital imaging device 250 is preferably a digital camera. The portable digital imaging device 250 includes a user interface ("UI") 252, an email application 256 containing a screening unit 258, an operating system 254 and communications devices 260. The communications devices 260 preferably include hardware, such as a modem, for connecting to the server (not shown) or other apparatus for delivering email as well as any drivers for controlling the hardware. In an alternate embodiment, some of the hardware, such as a modem, may be external to the portable digital imaging device. The UI 252 preferably includes a four-way button as well as soft keys and an LCD used to provide information to and obtain input from a user. The operating system 254 is coupled with the email application 256 and performs lower level functions for the portable digital imaging device 250.

In a preferred embodiment, the email application 256 functions in a similar manner to the email application 32 of the digital camera 30 depicted in FIG. 2A. Referring back to FIG. 8, the email application 256 is, therefore, preferred to be a control application which is selected upon boot up of the portable digital imaging device. In an alternate embodiment, however, the email application 256 may be one of a plurality of control applications that can run simultaneously on the portable digital imaging device 250. The email application 256 preferably sends email from the portable digital imaging device in a conventional manner. However, when receiving email, the email application preferably utilizes the screening unit 258 to implement the method 200 or 210 in order to ensure that the portable digital imaging device 250 completes reception of only those attachments which are allowed by the portable digital imaging device 250.

Because the portable digital imaging device 250 can use the methods 200 and 210, the portable digital imaging device 250 can terminate reception of attachments having types that are not allowed on the portable digital imaging device 250. As a result, such attachments are not downloaded to the portable digital imaging device 250 in their entirety. Consequently, the time, expense, and power that would otherwise be incurred by downloading unusable messages are saved. Consequently, the portable digital imaging device 250 may maintain its battery power for a longer time while saving its user time and money.

Figure 9:
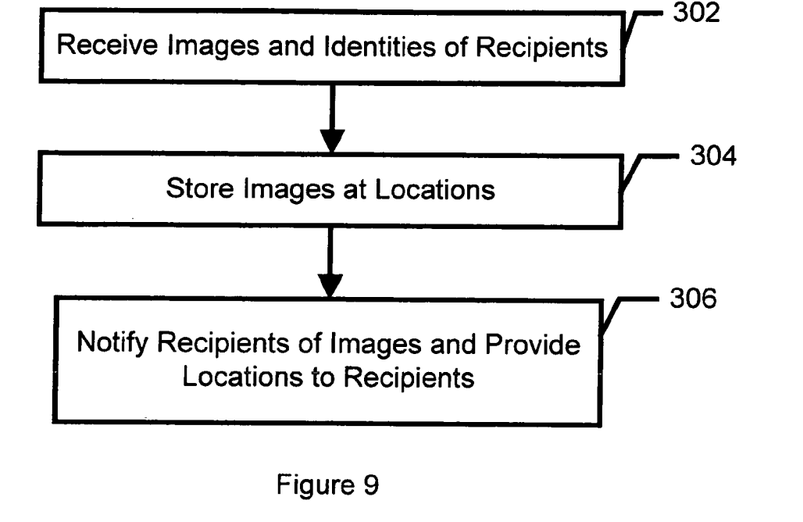
FIG. 9 is a high-level flow chart of a method for improving the efficiency of email traffic in accordance with a third aspect of the present invention.

To more particularly describe a third aspect of the present invention, refer to FIG. 9, which is a high-level flow chart of a method 300 for improving the efficiency of email traffic in accordance with a third aspect of the present invention. The method 300 improves the efficiency of email traffic by reducing the amount of email traffic received by recipients. The email traffic is reduced by reducing the number of image attachments sent to recipients. The sender of the message is preferably a portable digital imaging device. The method 300 is preferably implemented by a specialized server or other apparatus which receives email from a sender.

Images and the identities of the recipients are received, preferably from a portable digital imaging device, via step 302. Thus, the user of the portable digital imaging device provides the images to the server. The identity of a recipient is preferably the email address for the recipient. In a preferred embodiment, each image file includes the identities of the recipients of the recipients. The images are stored at one or more locations, each of which has an address, via step 304. In a preferred embodiment, the images are archived in a database residing on or coupled with the server implementing the method 300. The recipients are notified that images have been sent to them and provided with the location(s) of the images, via step 306. Step 306 is preferably performed by sending an email message to the recipients using the recipients' identities. The email message includes a notification of the images and the addresses of the locations at which the images are stored. Preferably, the form of the locations provided in step 306 are html links to the images. Users of the recipients can view the images by connecting to the locations, preferably using html links.

Because the locations of the images, rather than the images, are provided to the recipients, the messages to the recipients are smaller and can be more quickly and efficiently sent. Therefore, the bandwidth consumed by providing images to multiple recipients is reduced. In addition, the image is archived at the location. Thus, the user of the portable digital imaging device can be assured that for some period of time, the image will be available without consuming memory of the portable digital imaging device.

Figure 10:
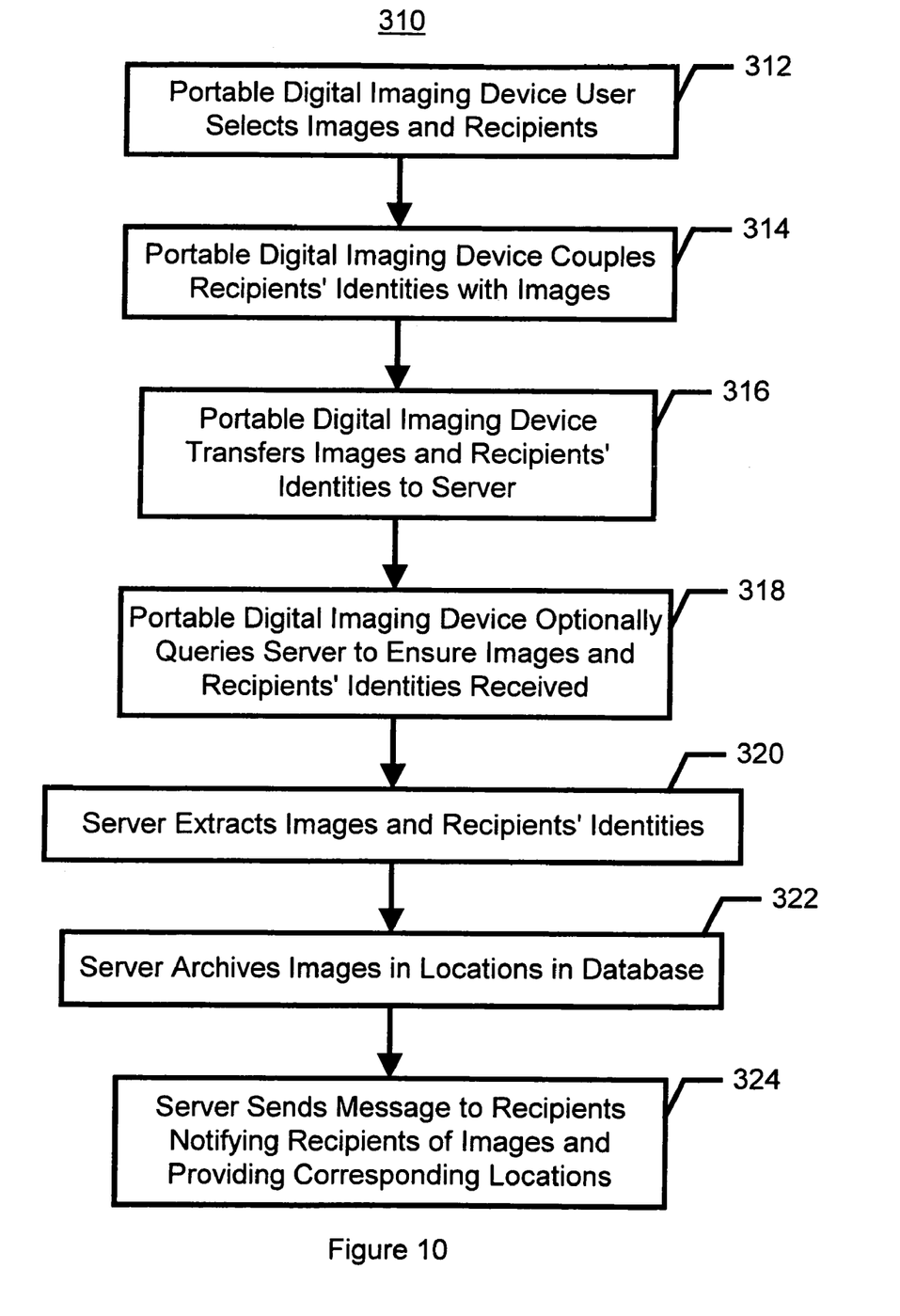
FIG. 10 is a more detailed flow chart of one embodiment of a method for improving the efficiency of email traffic in accordance with the third aspect of the present invention.

FIG. 10 is a more detailed flow chart of one embodiment of a method 310 for improving the efficiency of email traffic in accordance with the third aspect of the present invention. Like the method 300, the method 310 improves the efficiency of email traffic by reducing the amount of email traffic received by recipients. The email traffic is reduced by reducing the number of image attachments sent to recipients. In addition, the images sent can be archived, at least temporarily. The sender of the message is preferably a portable digital imaging device. The method 310 is preferably implemented by a specialized server or other apparatus which receives email from a sender and provides email to a user.

The user of the portable digital imaging device selects the images to be sent and the recipients of the images, via step 312. The portable digital imaging device couples the recipients' identities with the corresponding images, via step 314. Step 314 is preferably performed by storing the email addresses of recipients for a particular image in the image file for that image. However, the recipients' identities could be coupled to the image in another fashion. For example, the recipients' identities could be stored in a separate file from the corresponding images.

The portable digital imaging device transfers the images and recipients' identities to a server, via step 316. In a preferred embodiment, step 316 is performed by sending the image file containing the recipients' identities using file transfer protocol ("FTP"). FTP is preferred because FTP allows the portable digital imaging device to query the server to ensure that the images and identities are received. Such a query is generally not performed for email messages. FTP is also preferred over sending the images as an attachment to an email message because an image is typically encoded into text when sent as an attachment, while FTP is a binary transfer. Text encoding can increase the size of an image file because more than one character may be used to represent a byte of data in the image file. Thus, the use of email to send the images and recipients' identities increases the size of the message sent and the bandwidth consumed by sending the message. However, nothing prevents the images and recipients' identities from being transferred to the server via email or another mechanism. After the images and recipients' identities are sent in step 316, the portable digital imaging device may optionally query the server to ensure that the images and recipients' identities were received, via step 318.

The server extracts the images and recipients identities from the data transferred from the portable digital imaging device, via step 320. In a preferred embodiment, step 320 includes extracting an image and recipients' identities from each image file. The server then archives the images in a database at particular locations, via step 322. The server sends a message to the recipients of the images to notify the recipients of the images and to inform the recipients of the images' locations, via step 324. Preferably, the server sends an email message to the recipients containing at least html links to the images and a notification stating that images at the locations specified by the links are available for viewing.

Because the locations of the images are provided to the recipients, the messages to the recipients are smaller and can be more quickly and efficiently sent than if the images themselves were provided to the recipients. Traffic over the internet can thereby be decreased. The image is also archived on the database at the location. The user of the portable digital imaging device can thus be assured that for some period of time, the image will be available without consuming memory of the portable digital imaging device.

Figure 11:
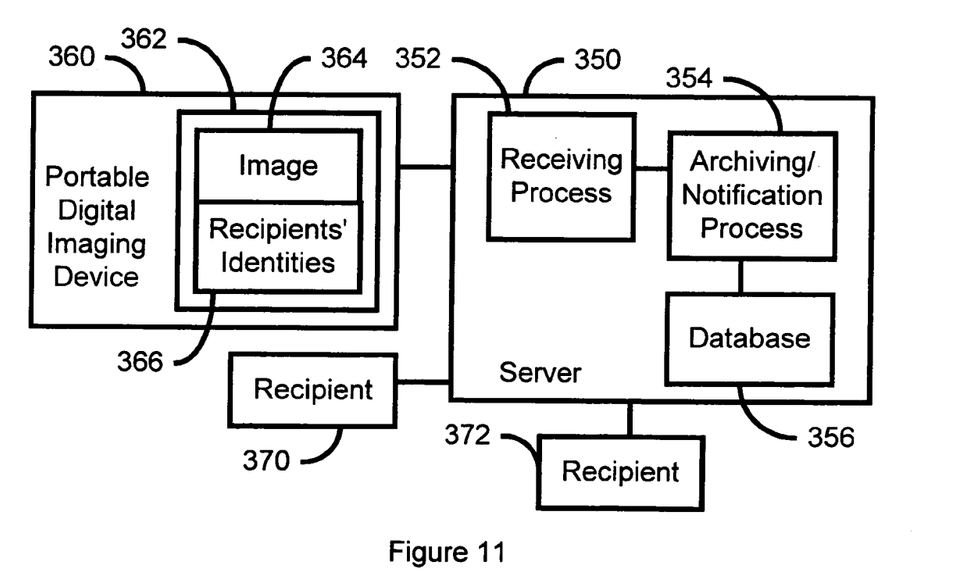
FIG. 11 is a block diagram of one embodiment of a server used in improving the efficiency of email traffic in accordance with the third aspect of the present invention.

FIG. 11 is a block diagram of one embodiment of a server 350 used in improving the efficiency of email traffic in accordance with the third aspect of the present invention. The server 350 implements the methods 300 and 310. Also depicted are a portable digital imaging device 360 and recipients 370 and 372. The portable digital imaging device 360 includes an image file 362. The image file 362 includes an image 364 and identities 366 of the recipients 370 and 372. The user of the portable digital imaging device 360 desires to send the image 366 to the recipients 370 and 372. The server is preferably coupled with the recipients 370 and 372 via the internet (not shown).

The server 350 includes several server processes 352 and 354, which are coupled to a database 356. The receiving server process 352 receives the image 364 and identities 366 of the recipients. The receiving process 352 is coupled to the archive/notification process 354. Preferably, the archive/notification process 354 performs most of the steps of the methods 300 and 310. Thus, the archive/notification process 354 extracts the identities 366 of the recipients 370 and 372 and the image 364, archives the image 364 in the database 356, and notifies the recipients 370 and 372 of the image.

Because the server implements the methods 300 and 310, the locations of the images are provided to the recipients, rather than the images themselves. The bandwidth used to notify the recipients 370 and 372 of the images is greatly reduced and efficiency increased. In addition, the image is archived in the database 356. The image will be thus available without consuming memory of the portable digital imaging device.

A method and system has been disclosed for improving the efficiency of the sending and receiving of email having attachments, particularly to and from a portable digital imaging device. Software written according to the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing a portable digital imaging device to receive an attachment associated with an email message, a first type of attachment being allowed by the portable digital imaging device, the attachment being described as a second type, the method comprising:
  (a) receiving the attachment and the email message from a sender;
  (b) receiving the first type from the digital imaging device;
  (c) determining whether the first type is the same as the second type prior to sending the attachment to the portable digital imaging device;
  (d) providing the attachment to the portable digital imaging device if the first type is the same as the second type; and
  (e) refusing to provide the attachment to the portable digital imaging device if the first type is not the same as the second type; and
  (f) establishing communication to the portable imaging device prior to the determining step (c).

2. The method of claim 1 wherein the email message further includes a header indicating the second type of the attachment and wherein the determining step (c) further includes:
  (c) reading the header to determine the second type.

3. The method of claim 2 wherein the header includes a name and the second type designation and wherein the reading step (c1) further includes:
  (c1i) reading the header to determine the name, the second type designation, or both the name and the second type designation.

4. The method of claim 3 wherein the determining step (c) further includes:
  (c2) utilizing the name, the second type designation, or both the name and the second type designation to determine whether the first type is the same as the second type.

5. The method of claim 1 wherein the portable digital imaging device further includes a digital camera.

6. A method for allowing a portable digital imaging device to receive an attachment associated with an email message, a first type of attachment being allowed by the portable digital imaging device, the attachment being described a second type, the method comprising:
  (a) determining whether the first type is the same as the second type prior to sending the attachment to the portable digital imaging device;
  (b) providing the attachment to the portable digital imaging device if the first type is the same as the second type; wherein the first type further includes a first preference and wherein the attachment providing step (b) further includes:
  (b1) determining whether a second preference of the attachment is the same as the first preference if the first type is the same as the second type;
  (b2) modifying the attachment to provide a modified attachment having a third preference if the first type is the same as the second type and if the first preference is different from the second preference, the third preference being provided from the first preference and being the same as the second preference;
  (b3) providing the attachment to the portable digital imaging device if the first preference is the same as the second preference; and
  (b4) providing the modified attachment to the portable digital imaging device if the first preference is not the same as the second preference;
  (c) refusing to provide the attachment to the portable digital imaging device if the first type is not the same as the second type; and
  (d) establishing communication to the portable imaging device prior to the determining step (a).

7. A server for communicating with and allowing a portable digital imaging device to receive an attachment associated with an email message, a first type of attachment being allowed by the portable digital imaging device, the attachment being described a second type, the server comprising:

at least a first server module for receiving a plurality of email messages, the plurality of email messages capable of including the email message; and  a screening unit, communicatively coupled with the at least the first server process, for managing the email message, the screening unit for determining whether the first type is the same as the second type prior to sending the attachment to the portable digital imaging device, providing the attachment to the portable digital imaging device if the first type is the same as the second type and refusing to provide the attachment to the portable digital imaging device if the first type is not the same as the second type;

wherein the screening unit determines whether the first type is the same as the second type after the server establishes communication with the portable digital imaging device and the server receives the first type from the portable digital imaging device.

8. The server of claim 7 wherein the email message further includes a header indicating the second type of the attachment and wherein the screening unit determines whether the first type is the same as the second type by reading the header to determine the second type.

9. The server of claim 8 wherein the header includes a name and the second type designation and wherein the screening unit reads the header to determine the name, the second type designation, or both the name and the second type designation.

10. The server of claim 9 wherein the screening unit utilizes the name, the second type designation, or both the name and the second type designation to determine whether the first type is the same as the second type.

11. The server of claim 7 wherein the portable digital imaging device further includes a digital camera.

12. A server for communicating with and allowing a portable digital imaging device to receive an attachment associated with an email message, a first type of attachment being allowed by the portable digital imaging device, the attachment being described a second type, the server comprising:

at least a first server process for receiving a plurality of email messages, the plurality of email messages capable of including the email message; and  a screening unit, communicatively coupled with the at least the first server process, for managing the email message, the screening unit for determining whether the first type is the same as the second type prior to sending the attachment to the portable digital imaging device, providing the attachment to the portable digital imaging device if the first type is the same as the second type and refusing to provide the attachment to the portable digital imaging device if the first type is not the same as the second type;

wherein the screening unit determines whether the first type is the same as the second type after the server establishes communication with the portable digital imaging device;

wherein the first type further includes a first preference and wherein the screening unit further determines whether a second preference of the attachment is the same as the first preference if the first type is the same as second type, modifies the attachment to provide a modified attachment having a third preference if the first type is the same as the second type and if the first preference is different from the second preference, the third preference being provided from the first preference and being the same as the second preference, provides the attachment to the portable digital imaging device if the first preference is the same as the second preference and provides the modified attachment to the portable digital imaging device if the first preference is not the same as the second preference.

13. A server for communicating with and allowing a portable digital imaging to receive an attachment associated with an email message, a first type of attachment being allowed by the portable digital imaging device, the attachment being described a second type, the server comprising:

means for receiving a plurality of email messages, the plurality of email messages capable of including the email message; and  means for managing the email message, the managing means further including means for determining whether the first type is the same as the second type prior to sending the attachment to the portable digital imaging device, means for providing the attachment to the portable digital imaging device if the first type is the same as the second type and means for refusing to provide the attachment to the portable digital imaging device if the first type is not the same as the second type  wherein the managing means determines whether the first type is the same as the second type after the server establishes communication with the portable digital imaging device and the server receives the first type from the portable digital imaging device.

14. A computer-readable medium including a program for allowing a portable digital imaging to receive an attachment associated with an email message, a first type of attachment being allowed by the portable digital imaging device, the attachment being described a second type, the program including instructions for:

(a) receiving the attachment and the email message from a sender;

(b) receiving the first type from the digital imaging device;

(c) determining whether the first type is the same as the second type prior to sending the attachment to the portable digital imaging device;

(d) providing the attachment to the portable digital imaging device if the first type is the same as the second type; and  (e) refusing to provide the attachment to the portable digital imaging device if the first type is not the same as the second type;

(f) establishing communication to the portable imaging device prior to the determining instructions (c) being performed.

\* \* \* \* \*

UNITED STATES PATENT AND TRADEMARK OFFICE
CERTIFICATE OF CORRECTION

PATENT NO. : 6,959,328 B1 Page 1 of 1
APPLICATION NO. : 09/527077
DATED : October 25, 2005
INVENTOR(S) : Richard Adams Gillaspy and Lynn Erich Petersen It is certified that error appears in the above-identified patent and that said Letters Patent is hereby corrected as shown below:

Column 14, line 16, the phrase "(c)" should be replaced with the phrase --(c1)--;

Column 14, line 34, the word --as-- should be inserted before the word "a";

Column 15, line 2, the word --as-- should be inserted before the word "a";

Column 15, lines 4-8, the word "module" should be replaced with the word --process--;

Column 15, line 42, the word --as-- should be inserted before the word "a";

Column 16, line 19, the word --as-- should be inserted before the word "a";

Column 16, line 41, the word --as-- should be inserted before the word "a";

Column 16, line 53, the word "and" should be deleted; and

Column 16, line 56, the word --and-- should be inserted after the semicolon (";").

Signed and Sealed this

Twenty-third Day of January, 2007

JON W. DUDAS
*Director of the United States Patent and Trademark Office*